United States Patent [19] [11] 4,220,840
Barker [45] Sep. 2, 1980

[54] PULSING PROBE FOR MICROWAVE OVEN
[75] Inventor: Charles E. Barker, Holland, Mich.
[73] Assignee: Robertshaw Controls Company, Richmond, Va.
[21] Appl. No.: 907,670
[22] Filed: May 19, 1978
[51] Int. Cl.[2] .............................................. H05B 9/06
[52] U.S. Cl. ........................ 219/10.55 B; 219/10.55 E; 219/10.55 R; 219/494; 219/497; 340/588; 126/19 R; 323/24
[58] Field of Search .................. 219/10.55 B, 10.55 E, 219/10.55 R, 10.55 M, 494, 497, 499, 506; 340/588, 589, 590, 596; 323/24; 126/19 R, 273 R; 99/421 TP

[56] References Cited
U.S. PATENT DOCUMENTS

| 3,300,622 | 1/1967 | Swain | 219/501 |
|---|---|---|---|
| 3,789,190 | 1/1974 | Orosy et al. | 219/499 |
| 3,859,644 | 1/1975 | Main | 340/588 |
| 3,909,598 | 9/1975 | Collins et al. | 219/10.55 R |
| 3,959,692 | 5/1976 | Wetzel | 219/497 |
| 3,988,577 | 10/1976 | Leitner et al. | 219/506 |
| 3,990,000 | 11/1976 | Digneffe | 323/24 |
| 4,011,499 | 3/1977 | Betsill et al. | 323/62 |
| 4,066,867 | 1/1978 | Bechtel | 219/497 |
| 4,093,841 | 6/1978 | Dills | 219/10.55 B |

Primary Examiner—Roy N. Envall, Jr.
Assistant Examiner—Philip H. Leung
Attorney, Agent, or Firm—Fulwider, Patton, Rieber, Lee & Utecht

[57] ABSTRACT

A microwave oven cooking control system is provided with a comestible probe for temperature sampling. The comestible probe is only intermittently energized so that self-heating is avoided. Energization of the probe is under the control of a timing mechanism, which concurrently produces a voltage signal that rapidly increments in steps corresponding to possible internal temperatures of the comestible. The voltage signal is compared against a reference voltage level, which in turn is governed by the internal temperature of the comestible as sensed by the probe. The comparison results are used to deactuate energization of the probe and to control the microwave energy transmitted to the comestible by the microwave oven magnetron. A threshold a.c. current detector is also connected to said magnetron control to deactuate operation of the magnetron when a low amplitude a.c. power signal is received.

8 Claims, 4 Drawing Figures

U.S. Patent  Sep. 2, 1980  4,220,840
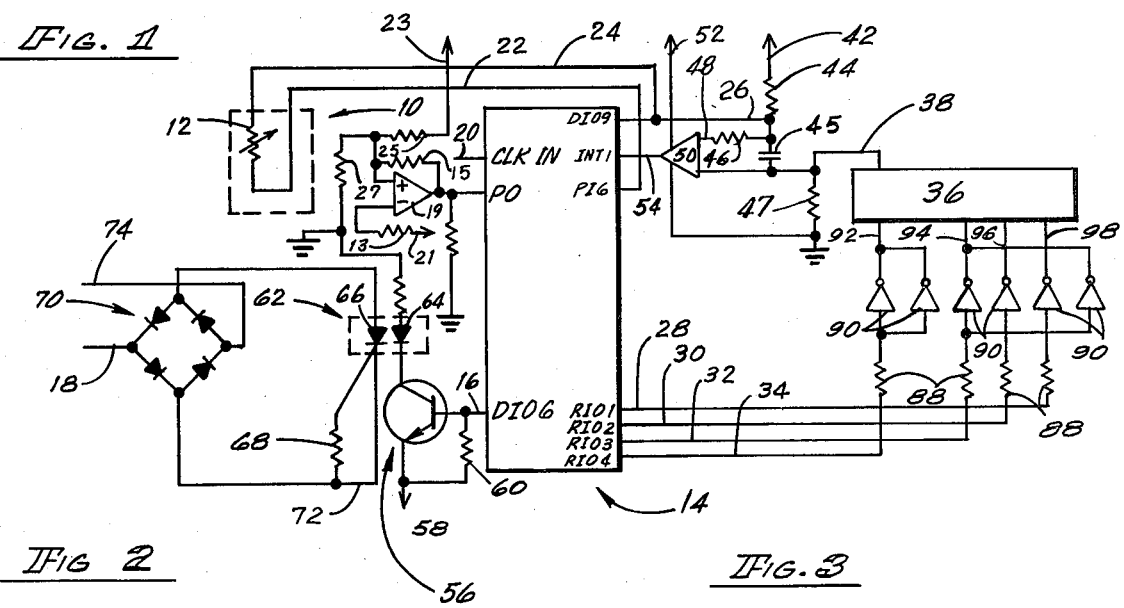
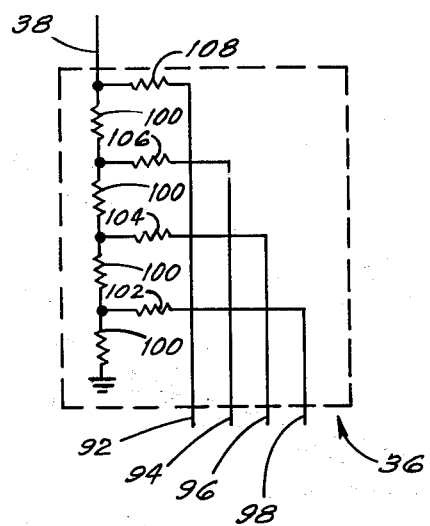
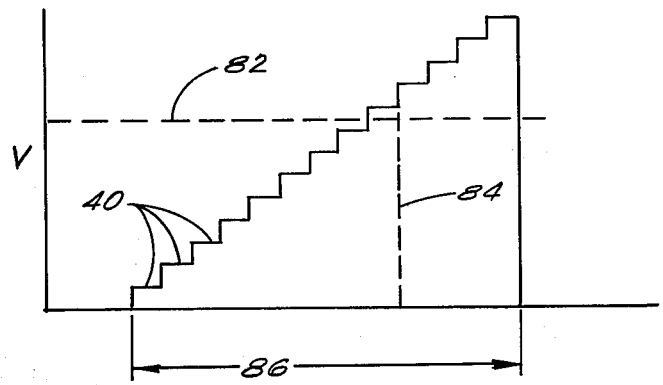
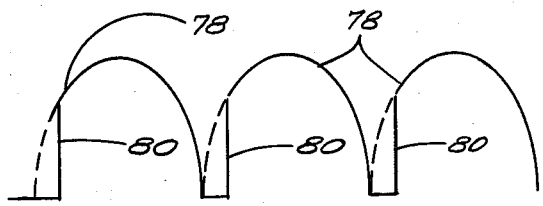

PULSING PROBE FOR MICROWAVE OVEN

BACKGROUND OF THE INVENTION

1. Field of the Invention

The present invention relates to microwave cooking control devices for use in association with microwave ovens and ranges.

2. Description of the Prior Art

Microwave ovens are devices which in recent years have gained increased popularity as a means for cooking food. Microwave ovens differ from prior natural gas ovens and electric ovens by reason of the manner in which heat energy is applied to the comestible to be heated for consumption. In gas and electric ovens, fuel is consumed or electric current is used to heat electrical resistors to produce infrared radiation within a heat confining chamber, which is the oven enclosure. By reason of the external application of heat to the ambient atmosphere surrounding the comestible and to the comestible itself, the temperature of the oven chamber as well as the temperature of the comestible is increased. Such an increase in temperature over a predetermined period of time cooks the comestible in readiness for human consumption.

In microwave ovens, on the other hand, a microwave energy generation system, typically employing a magnetron as the microwave generator, is positioned to direct microwave energy toward a comestible located in the oven. The ambient air surrounding the comestible is not heated, but rather heat energy is generated only within the comestible itself, since the comestible, but not the ambient air, transforms the microwave energy to infrared heat energy. The amount of infrared energy produced is directly controlled by the amount of microwave energy imparted to the comestible, which in turn is governed by the portion of each alternating current wave which is used during the cooking cycle to actuate the magnetron to produce microwaves.

Different types of sensors are necessary in microwave ovens than those employed in controlling conventional gas and electric ovens. In conventional gas and electric infrared heating ovens, the ambient temperature surrounding the comestible rises with the temperature of the comestible, so that a sampling of the temperature within the oven chamber is indicative of the temperature of the comestible itself. In microwave heating, on the other hand, because the ambient air surrounding the comestible does not transform microwave energy to infrared energy, the ambient air in the oven chamber itself is at a temperature far less than any comestible inserted therein. Accordingly, a difficulty exists in sampling the state of readiness for consumption of the comestible in microwave ovens. A sampling of the internal temperature within the oven enclosure is meaningless, so that some other system is necessary. One method of controlling cooking in a microwave oven is to merely calculate the weight of the comestible, determine from a reference manual the length of time that experience has shown is suitable to cook a comestible of the type involved to achieve satisfactory cooking results, and actuate the microwave oven for that length of time. However, individual variations in shapes of comestibles, miscalculations as to comestible sizes, and other factors render such unmonitored cooking unsatisfactory. Rather, some sensing means for feeding back comestible temperature is desired.

Since a microwave oven utilizes electrical controls for the purpose of governing actuation of the magnetron, a suitable sensor element must provide an electrical signal indicative of internal temperature of the comestible. One such device is a thermistor encased within a probe which is inserted into the interior of the comestible. A thermistor includes a heat sensitive resistor, the resistance of which varies with temperature. Accordingly, in prior art microwave temperature probe systems the probe thermistor was supplied with a known voltage, and the voltage drop of the thermistor was measured. The greater the temperature of the comestible, the less is the electrical resistance of the thermistor so that increased comestible temperature produces a decreased voltage drop across the thermistor.

However, conventional thermistor probes have suffered from one very fundamental defect when used to control actuation of the microwave magnetron. Because a thermistor is heat sensitive, and since in order to provide a useful signal the thermistor must be supplied with electrical current, the thermistor element tends to be self-heating. That is, the provision of a voltage level to actuate the thermistor results in a flow of electrical current therethrough. The electrical resistance resulting from the flow produces self-heating of the thermistor, so that the thermistor temperature is raised independent of the comestible. This rise in temperature is not attributable to the heating effects resulting from the supply of microwave energy by the magnetron to the comestible, but rather is attributable to a large degree to the supply of a voltage to the probe. As a result, compensation for probe self-heating has been necessary, but has detracted significantly from the precision of temperature control of the comestible using a thermistor probe.

SUMMARY OF THE INVENTION

It is an object of the present invention to obviate self-heating in a thermistor probe used to sense temperature in a comestible in a microwave oven. This increases the reliability of the output signal of the probe thermistor so that this signal is much more closely indicative of the microwave heating effects in the comestible. Because of this increased reliability, compensation for self-heating of the probe is no longer necessary. Instead, the probe temperature signal may be used without compensation to control the extent to which microwaves are generated by the magnetron.

Accordingly, and in the preferred embodiment of the invention, the probe thermistor is supplied with an electrical voltage to enable sampling for a total of less than four percent of the overall cooking cycle.

Another object of the invention is to provide a thermistor probe for use in controlling temperature of a comestible in a microwave oven in which an analog voltage signal can be readily transformed to a digital code useful in controlling actuation of the magnetron. Most microwave ovens are now controlled by microprocessors, which are small computers constructed of large scale integrated (LSI) electrical circuitry. Such microcomputers employ binary numbers and codes and do not respond directly to analog inputs. Rather, analog inputs must be transformed to digital inputs by some form of analog to digital conversion. Since the processing of analog signals requires considerably more time than the processing of digital signals, a system which would require the presence of an analog temperature signal from a probe thermister in order to generate a digital code would require the supply of voltage to the probe thermistor for an excessively long period of time. This would again create the self-heating effects to be avoided. To obviate this difficulty, the analog output of the probe thermistor is not directly converted to a digital number, but rather is used to control a reference voltage level, which in turn triggers latching of a digital code generated internally within a microprocessor. Because code generation is internal to the microprocessor, it proceeds much more rapidly than would an analog to digital conversion external to the microprocessor. As a consequence, the requisite reduction in time required for provision of a voltage to the probe thermistor is dramatically reduced so that the probe is not actuated long enough to exhibit self-heating. Rather, the probe is actuated for only a three hundred microsecond interval during each probe sampling interval. This is insufficient time for the temperature of the thermistor to be raised through self-heating.

A further object of the invention is to provide a magnetron control which senses a fall in a.c. voltage from the a.c. power supply to the microwave oven. Such voltage reductions sometimes occur in the provision of commercial power, and when of an extended duration, are referred to as "brown out" conditions. That is, during such "brown out" conditions a normal 110 volt a.c. supply is reduced to a value of perhaps 90 volts or less. Operation of the microwave oven during such conditions adversely affects the magnetron, since magnetrons will become damaged if driven by an insufficient voltage. This difficulty is obviated by the present invention, however, by deriving both a stabilized and an unstabilized d.c. voltage from the a.c. supply. The stabilized a.c. voltage is held at a constant d.c. level by a voltage regulating circuit. The unstabilized supply is merely drawn from the secondary of a transformer and rectified and smoothed. The primary of the transformer is connected to the a.c. line supply voltage. The stabilized and unstabilized voltages are supplied in opposition to a differential amplifier. Decreases of the unstabilized voltage below a minimum threshold level removes the output from the differential amplifier, which is an enabling signal for the magnetron control. The magnetron is thereby rendered inoperative and protected from damage during low a.c. voltage supply conditions.

The invention is illustrated with greater clarity and particularity by reference to the accompanying drawings.

BRIEF DESCRIPTION OF THE DRAWINGS

FIG. 1 illustrates a logic diagram of one embodiment of the thermister probe control system.

FIG. 2 illustrates in detail the digital to analog conversion network of FIG. 1.

FIG. 3 graphically illustrates the d.c. voltage output derived from the digital code; and FIG. 4 depicts the waveform of a supply voltage to the magnetron control.

DESCRIPTION OF THE EMBODIMENT

FIG. 1 illustrates a control circuit for periodically energizing a thermistor probe for use in a microwave oven. The thermistor probe is indicated generally at 10 and includes a thermistor 12, which is a temperature sensitive resistor that has a resistance value that varies inversely with temperature. The microwave oven is equipped with a digital processor 14 which serves as the central control element governing all aspects of oven operation. Certain portions of the digital processor 14 are useful implementations of the control circuitry necessary to the invention. The digital processor 14 may be a single circuit microcomputer designated as the PPS-4/1 MM76 by its manufacturer, Rockwell International, Microelectronics Device Division, 3310 Miraloma Avenue, Anaheim, Calif. 92803. The microcomputer 14 is a single chip device and contains a read only memory for program memory functions, a random access memory for data parameter and working storage, and an input/output capability which provides an interface for several control, sensor and display circuits of the microwave oven. Specific features of the microprocessor 14, as embodied in the MM76 microcomputer, are described in document number 29410-N41, Revision 2, October 1976, published by the manufacturer. It should be borne in mind that only a very few features of the microcomputer 14 are utilized for the probe sensor and magnetron control arrangement required pursuant to the present invention.

A digital to analog converter 36, and a differential amplifier 50 are also required for implementation of the control circuit of the invention. One input to the differential amplifier 50 is from the digital to analog converter 36, while an opposing input is derived from a reference voltage source and has an input value dependent upon the resistance in the probe 10.

One of the discrete input output ports DI06 of the microcomputer 14 is connected to an output line 16 which ultimately produces a gating signal to control energization of the magnetron in a microwave oven on line 18. A differential amplifier 19, having opposing inputs from a stabilized −15 volt a.c. voltage supply on line 21 and an unstabilized d.c. voltage supply on line 23 has an output connected to the microprocessor port labeled PO of microprocessor 14. If the a.c. line voltage falls below a threshold level, as determined by the values of resistors 13, 15, 25 and 27, the differential amplifier 19 provides a signal to terminal PO to remove an enabling signal which suppresses an output on line 16 to the magnetron control circuitry. The microprocessor 14 performs as a timing circuit in response to a clock input on line 20 to periodically energize and de-energize the thermistor probe 10 in synchronization with a sampling interval internally established within the microprocessor 14. Preferably, the sampling interval occurs no more frequently than 12 times per second, and the thermistor probe 10 is energized for a period no greater in duration than 500 microseconds during each sampling interval. The thermistor probe 10 is connected to the microprocessor 14 by lines 22 and 24 to provide an input thereto to allow detection of the temperature of the probe 10.

A discrete input/output line 26 connected to port DI09 of microprocessor 14 is normally internally grounded by the microprocessor 14 except during intervals of sampling of the thermistor probe 10. When grounded, line 26 inhibits the energization of thermistor probe 10 since both of the leads 22 and 24 are then internally grounded by the microprocessor 14, so that no voltage differential appears across the thermistor probe leads. Clock signals on line 20 are connected to a clock input port CLK IN in microprocessor 14. The clock pulses strobe an internal clock pulse counter, so than when the internal counter reaches a predetermined number of clock pulses, line 26 is periodically ungrounded at the DI09 port to initiate a sampling interval.

Lifting of the ground from lead 26 also enables an internal counter within the microprocessor 14 to periodically generate a digital code during the sampling intervals. This code appears on lines 28, 30, 32 and 34 at output ports labelled RI01 through RI04. The binary code appearing on the four output lines 28–34 is rapidly altered in response to clock pulse inputs on line 20. Through a digital to analog converter 36 depicted in FIG. 1, a d.c. voltage output signal is provided on line 38. The voltage level of this voltage output signal responds to alterations of the digital code on lines 28–34 and increases in stepwise fashion over uniform subintervals of time, corresponding to the duration of clock pulses on line 20. The voltage signal level on line 38 preferably increases in equal steps as indicated at 40 in FIG. 3.

Concurrently, with the generation of the output signal on line 38, a constant d.c. voltage level is provided on line 42 in FIG. 1, preferably from the stabilized −15 volt source. This d.c. voltage is passed through a resistor 44 to an intersection with line 26. A blocking capacitor 45 is connected across lines 26 and 38, and a stabilizing resistor 47 is connected to ground. Another resistor 46 is coupled to line 26 and is connected as one input on line 48 to a differential amplifier 50. The signal on line 48 is a d.c. thermistor dependent voltage signal. The opposing input to the differential amplifier 50 is from the voltage signal line 38 from the output of the digital to analog converter 36.

Differential amplifier 50 is operated from an unstabilized −27 volt supply on line 52 and provides an output on line 54 to an interrupt port labelled INT1 in the microprocessor 14. Appearance of an output signal from the differential amplifier 50 on line 54 returns input port DI09 to its normally grounded condition and abruptly terminates generation of the digital code on lines 28–34. Appearance of a signal on line 54 also triggers an internal comparison within the microprocessor 14 to compare the value of the complement of the last digital code to appear on lines 28–34 with a digital code stored in RAM memory and produced as an operator controlled desired comestible temperature. Typically, the comestible temperature will be selected on the oven control panel using a rotary dial or a slide switch.

During heating of the comestible, a gating signal output to the magnetron appears on line 16. This gating signal delivers a base bias to a transistor 56. The emitter of transistor 56 is connected to the −27 volt supply by line 58, and a resistor 60 is coupled between the emitter and base of the transistor 56. The collector of transistor 56 is connected to an electrical isolating circuit 62. The purpose of the isolating circuit 62 is to prevent any feedback of the magnetron driving signal through the microprocessor 14 to any of the oven controls or to the probe 10.

The isolating circuit 62 includes a light emitting diode 64 and a light sensitive silicon controlled rectifier 66 encased within a darkened housing. The gate of the silicon control rectifier 66 is coupled through a resistor 68. The output of the silicon control rectifier 66 is directed to a terminal of a rectifying bridge 70 by line 72. An a.c. input on line 74 establishes a cycle of alternating current input to the bridge 70. Depending upon the time of acutation of the silicon controlled rectifier 66 within each half wave cycle, a gating signal will appear on line 18 to the oven magnetron. The time of appearance of the SCR output on line 72 within the envelope of the a.c. signal appering on line 74 establishes the portion of the repetitive driving cycle from line 74 during which the magnetron is driven by an output on line 18. Alteration in the time of appearance of the output from the SCR 66 varies the portion of time during which the magnetron is actuated.

The rectified sinusoidal wave form input of the 110 volt alternating input current on line 74 is depicted graphically at 78 in FIG. 4. However, the output on line 18 does not occur until the SCR 66 turns on, which is indicated by the conductive portion of the cycle indicated at 80. Accordingly, the output to the magnetron on line 18 is indicated by the solid portion of the rectified sinusoidal cyclical wave forms 78 depicted in FIG. 4. The dashed lines portions indicate the initial delay in energization of the magnetron during each wave form which preceeds firing of the SCR 66.

The time at which the SCR 66 fires is internally set in ROM memory within the microprocessor 14. The optimum portion of the cyle during which the SCR turns on, at 80 in FIG. 4, is established with the anticipation of appearance of a 110 volt a.c. signal as line current which is rectified and appears at line 74. Fall of the a.c. signal below a threshold, such as 90 volts for example, would cause the SCR 66 to drive the magnetron for an inordinately large portion of the cycle 78, and at too low a voltage. Accordingly, a guard circuit is provided with an enabling signal input to port PO of the microprocessor 14.

The guard circuit includes a differential amplifier 19 having one input 21 from the −15 volt stabilized d.c. supply through resistor 13. The opposing input is at 23 from the unstabilized −27 volt d.c. supply, which varies in voltage level according to the amplitude of the driving a.c. line current signal. Connection to the differential amplifier 19 is from a tap between a pair of dropping resistors 25 and 27. The differential amplifier 19 provides an enabling signal to port PO as long as the input from the −27 volt supply remains above the threshold level. The level of this enabling signal is stabilized by a resistor 67, which is connected to ground. If the a.c. amplitude drops, however, thereby dropping the unstabilized valve of the d.c. supply at 23 from 27 volts, the output of differential amplifier 19 goes to zero. The disappearance of this enabling input removes the base bias output to line 16 from port DI06 of microprocessor 14, thereby disabling the magnetron. This prevents damage to the magnetron during low voltage, or "brown out" conditions.

The time of appearance of the interrupt or latching signal on line 54 is directly proportional to the level of the reference voltage signal to differential amplifier 50 on line 48. This voltage level is inversely proportional to the voltage drop through the thermistor element 12 in the thermistor probe 10. As temperature in the comestible increases, resistance within the thermistor element 12 decreases. This decreases the voltage reference level 82 in FIG. 3. The voltage signal on line 38 increases in stepwise increments 40, over uniform subintervals of time, as depicted in FIG. 3. Since the interrupt signal on line 54, depicted in dotted lines at 84 in FIG. 3, does not appear until the voltage signal on line 38 exceeds the voltage reference signal level on line 82, a higher voltage reference level means a longer duration from the initiation of the sampling interval until appearance of the interrupt signal on line 54, indicated at 84 in FIG. 3. Because the entire width of the maximum sampling interval, indicated at 86 in FIG. 3, is only 300 microseconds, and since the sampling interval is repeated only 10 times per second, any self-heating effects of the probe 10 are negligible regardless of the voltage reference level 82. The interrupt signal on line 54 serves as an output control signal when the voltage signal on line 38 reaches the voltage reference level 82.

Each time the interrupt signal on line 54 appears, the complement of the digital code which last appeared on lines 28–34 is latched into an internal comparator in the microprocessor 14. A second input to the comparator is from RAM memory within the microprocessor 14, and is a digitized code for the desired comestible temperature. Once the comestible has been heated sufficiently, the complement of the digital code last appearing on lines 28–34 equals the code stored in RAM memory. Until that time, the desired temperature stored in RAM memory is greater than the complement of that appearing on lines 28–34 at the time of generation of the interrupt signal on line 54. Once equality in the comparison has been achieved, however, the base bias signal is removed from line 16 by the microprocessor 14 to terminate the cooling cycle.

The digital code on lines 28–34 may elicit uniform voltage increments 40, although it may be desirable for the voltage signal on line 38 to increase in nonuniform stepwise increments, or to even ramp up gradually. However, in the preferred embodiment of the invention the uniform stepwise increments 40 of FIG. 3 are produced by a digital to analog converter network 36 known as a R-2R network. Inputs to the R-2R network 36 are through resistors 88 in FIG. 1 which are inputs to inverters 90 that buffer the relatively high voltage levels that appear on lines 28–34. The inverters 90 have a low output impedance so that the binary inputs on lines 92–98 to the digital to analog converter 36 are highly regulated. The inverters 90 thereby act as drivers and minimize error due to source resistance.

The R-2R digital to analog conversion network 36 is depicted in detail in FIG. 2. The network 36 in its preferred embodiment utilizes a series chain of resistors 100 with one value having their junctions connected through resistors 102, 104, 106 and 108 each having twice the value of resistors 100. The resistors 102, 104, 106 and 108 are connected respectively to input lines 92, 94, 96 and 98. The resistor 102 is connected through another resistor 110 to ground, as indicated.

Operation of the control circuit of the invention may be illustrated by way of example. If it is desired to cook a cut of roast beef, for example, the prescribed temperature of the interior of the roast for medium rare is, perhaps, 150¼° F. The probe 10 is then inserted into the roast until its tip, containing the thermister 12, is approximately at the center of the roast. A temperature designation of 150¼° F. is then selected by manipulation of the proper operator controls on the oven control panel. This effectuates storage of a digital code corresponding to 150¼° F. in RAM memory in the microprocessor 14. The roast is then placed in the microwave oven and the oven lock engaged.

When the microwave oven is initially turned on, the temperature of the thermistor element 12 of the thermistor probe 10 is likely to be quite low. This means that the resistance of the thermistor element 12 is relatively high, since resistance varies inversely with temperature. At the initiation of a probe temperature sampling cycle by lifting of the ground from line 26, the high resistance in the thermister element 12 will mean that the greater portion of the voltage between the d.c. voltage source 42 and ground will appear as a voltage drop across the thermistor element 12. This means that a higher voltage reference level, indicated at 82 in FIG. 3, will appear as an input on line 48 to the operational amplifier 50. Accordingly, a greater number of codes will be generated internally by the microprocessor 14 and a greater number of incremental voltage steps will appear on the voltage signal line 38 to the opposing input of the operational amplifier 50, which serves as a comparator, before the input on line 38 exceeds the thermistor dependent input on line 48. Once the voltage signal on line 38 exceeds the thermistor dependent input on line 48, an interrupt signal is generated and appears on line 54. As the digital code applied to lines 28–34 is increased in unitary increments, the complement of that digital code is passed internally within the microprocessor 14 to a comparator. In the complement of the code used in the comparator, binary bit positions which have a zero value on lines 28–34 have a "one" value in the complement, and bits which are "one" in the code on lines 28–34 are zero in the complement.

Following each sampling interval the ground is returned to line 26 to remove the voltage input to the probe 10. This prevents the thermistor element 12 from exhibiting self-heating and thereby preserves the integrity of temperature readings therefrom.

As cooking proceeds, the comestible ultimately reaches the desired temperature, the resistance of the thermistor element 12 of the probe 10 falls, so that less of a voltage drop appears thereacross. This means that the thermistor dependent level at input 48 to the differential amplifier 50 is less than when heating was initiated. Accordingly, an interrupt signal will be generated much earlier in the sampling cycle. When this interrupt or output control signal on line 54 occurs prior to the generation of a predetermined digital code initially keyed into the oven as the desired comestible temperature, the system is able to ascertain that indeed comestible has reached the desired temperature. Accordingly, a comparison function within the microprocessor 14 is performed with respect to the complement of the last code generated prior to appearance of the interrupt signal on line 54 and the corresponding internally stored desired temperature. The drop of the thermister dependent voltage on line 48 to the differential amplifier 50 will ultimately result in an equivalent comparison between the complement of the last digital code generated by the microprocessor 14 and appearing on output lines 28–34 and the internally stored code reflecting the desired comestible temperature. When an equal comparison occurs, the oven is shut off.

Undoubtedly numerous variations and modifications of the invention will become readily apparent to those familiar with microwave ovens and microwave oven sensors. However, the invention should not be construed as limited to the specific embodiment depicted, but rather is defined in the claims appended hereto.

I claim:

1. A control circuit sensitive to the presence of a thermistor probe in a microwave oven cyclically actuated by a magnetron to achieve a predetermined desired temperature comprising:

a timing circuit for intermittently energizing said thermistor probe to elicit a probe voltage drop signal therefrom for a short interval by cyclical application of a preset d.c. voltage thereto, and thereafter de-energizing said thermistor probe for a long interval by removal of said d.c. voltage therefrom, wherein the duration of energization during said short interval is no greater than 500 microseconds and no greater than 0.6 percent of the duration of an energization and de-energization cycle including:
clock pulse input means,
a pulse counting circuit for counting clock pulses during said energization interval and for providing a multibit binary output indicative of most recent pulse count,
digital to analog conversion means for producing a d.c. voltage output of magnitude controlled by the most recent pulse count,
differential amplifying means connected to receive as one input said output of said digital to analog conversion means and as an opposing input said probe voltage drop signal, and to provide an output signal identifying the greater of said inputs thereto,
digital storage means for storing a digitally encoded, manually provided signal indicative of said desired temperature,
comparator means connected to said digital storage means, said pulse counting circuit and to said differential amplifying means for sensing a change in identity of the greatest input to said differential amplifying means to initiate a comparison of said output of said pulse counting circuit and said desired temperature, and connected to supply a regulating signal, and
means responsive to said regulating signal for controlling actuation of said magnetron in response to the level of resistance in said probe.

2. A control circuit according to claim 1 further characterized in that said digital to analog conversion means produces sequential outputs of d.c. voltage levels that increase in stepwise increments during a counting cycle.

3. A control circuit according to claim 1 further characterized in that said timing circuit energizes said thermister probe no more frequently than twelve times per second.

4. In a microwave oven employing a magnetron as a cooking element and a magnetron control for driving said magnetron to achieve a predetermined temperature in a comestible to be cooked as designated by a digital control code provided thereto, and employing a thermistor temperature probe in said comestible to be cooked, the improvement comprising
means for periodically generating a digital code during sampling intervals and for altering said code at uniform subintervals of time,
means for generating an increased voltage signal of value responsive to said digital code,
timing means for cyclically energizing said thermistor probe for short sampling intervals and for alternately deenergizing said thermistor probe for long intervals, wherein the duration of said sampling intervals is no greater than 500 microseconds, and the proportionate duration of said sampling intervals to the duration of each cycle is no greater than 0.6 percent of each cycle,
voltage source means responsive to said timing means for providing a constant d.c. voltage supply to said thermistor probe only during said sampling intervals to derive a d.c. signal of a level dependent upon voltage drop in said thermistor probe, and
means for comparing said digital control code with said periodical generated digital code whenever said increased voltage signal responsive to said digital code exceeds said d.c. signal dependent upon voltage drop in said thermistor probe and for producing an output control signal when said voltage signal responsive to said digital code reaches the level of said digital control code, whereby said output control signal thereupon deactivates said magnetron control.

5. A microwave oven according to claim 4 further characterized in that said voltage source means includes a fixed resistance connected in series to said thermister, and an electrical connection from between said fixed resistance and said thermister is provided, and said means for comparing includes a differential amplifier, having one input from said electrical connection and another input from said means for generating said voltage signal.

6. A microwave oven according to claim 5 further characterized in that a thermistor dependent signal inhibit line is connected to said voltage source means and includes bistable switching means to ground said voltage source means in a first bistable state to prevent the transmission of electrical power to said thermistor except during generation of said digital code and to otherwise remove said ground to couple said thermistor to said voltage source means and to actuate said means for generating said digital code in a second bistable state.

7. A microwave oven according to claim 6 further characterized in that said timing means includes clock means for closing said bistable switching means to said second bistable state to remove said ground at 0.1 second intervals, and said output control signal is connected to return said switching means to said first bistable state at intervals of no greater than 300 microseconds following closure to said second bistable state.

8. A control circuit for periodically energizing a thermistor probe in a microwave oven comprising:
a digital processor for responding to probe temperature to control energization of the magnetron in a microwave oven,
a sampling circuit connected to provide an input to said digital processor for detecting the temperature of said probe,
a timing circuit for periodically energizing and de-energizing said thermistor probe in synchronization with a sampling interval established by said digital processor, wherein the duration of energization of said thermistor probe is no greater than than 500 microseconds and is not greater than 0.6 percent of each cycle of energization and de-energization.

* * * * *

UNITED STATES PATENT AND TRADEMARK OFFICE
CERTIFICATE OF CORRECTION

PATENT NO. : 4,220,840
DATED : September 2, 1980
INVENTOR(S) : Charles E. Barker It is certified that error appears in the above-identified patent and that said Letters Patent are hereby corrected as shown below:

At column 9, claim 3, lines 2-3, delete the word "thermister" and substitute in place thereof the word --thermistor--.

At column 10, claim 5, lines 3 and 5, delete the word "thermister" and substitute in place thereof --thermistor--.

Signed and Sealed this

Seventh Day of April 1981

[SEAL]

Attest:

RENE D. TEGTMEYER

Attesting Officer       Acting Commissioner of Patents and Trademarks